(12) United States Patent
Kurematsu et al.

(10) Patent No.: US 11,493,114 B2
(45) Date of Patent: Nov. 8, 2022

(54) CHAIN GUIDE

(71) Applicant: TSUBAKIMOTO CHAIN CO., Osaka (JP)

(72) Inventors: Yuji Kurematsu, Osaka (JP); Kaori Mori, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 390 days.

(21) Appl. No.: 16/728,247

(22) Filed: Dec. 27, 2019

(65) Prior Publication Data

US 2020/0256434 A1 Aug. 13, 2020

(30) Foreign Application Priority Data

Feb. 12, 2019 (JP) .............................. JP2019-022913

(51) Int. Cl.
*F16H 7/18* (2006.01)
(52) U.S. Cl.
CPC ......... *F16H 7/18* (2013.01); *F16H 2007/185* (2013.01)
(58) Field of Classification Search
CPC ...... F16H 2007/0872; F16H 7/18; F16H 7/08; F16H 2007/185
USPC .................................................. 474/111, 140
See application file for complete search history.

(56) References Cited

U.S. PATENT DOCUMENTS

| | | | | |
|---|---|---|---|---|
| 4,798,562 A * | 1/1989 | Matson | ..................... | F16H 7/08 474/140 |
| 4,826,468 A * | 5/1989 | Friedrichs | ................. | F16H 7/08 474/140 |
| 4,832,664 A * | 5/1989 | Groger | .................... | F01L 1/022 474/140 |
| 4,921,472 A * | 5/1990 | Young | ...................... | F16H 7/08 474/140 |
| 5,045,032 A * | 9/1991 | Suzuki | ...................... | F16H 7/08 474/140 |
| 5,184,983 A * | 2/1993 | Shimaya | ................... | F16H 7/08 474/140 |
| 5,318,482 A * | 6/1994 | Sato | .......................... | F16H 7/18 474/140 |
| 5,720,682 A * | 2/1998 | Tada | ...................... | F01M 9/108 474/140 |
| 5,779,582 A * | 7/1998 | Mott | ........................ | F16H 7/18 474/140 |
| 5,813,935 A * | 9/1998 | Dembosky | ................ | F16H 7/18 474/140 |
| 5,853,341 A * | 12/1998 | Wigsten | .................... | F16H 7/08 474/140 |
| 5,961,411 A * | 10/1999 | Tsutsumi | .................. | F16H 7/18 474/140 |
| 5,984,815 A * | 11/1999 | Baddaria | .................. | F16H 7/08 474/140 |

(Continued)

*Primary Examiner* — Henry Y Liu
(74) *Attorney, Agent, or Firm* — WHDA, LLP

(57) ABSTRACT

To provide a simple-structured chain guide with improved durability and capable of preventing detachment or breakage of a supplementary member and of reliably reducing vibration and noise. The chain guide includes a supplementary member made of a different material from a guide body. The supplementary member is configured to have an engaging hole, which allows attachment of the supplementary member to a side face of a support wall part provided between a guide part and a base part of the guide body.

8 Claims, 7 Drawing Sheets

(56) References Cited

U.S. PATENT DOCUMENTS

| | | | | |
|---|---|---|---|---|
| 5,989,138 A * | 11/1999 | Capucci | ................... | F16H 7/18 474/140 |
| 6,013,000 A * | 1/2000 | Moretz | ................... | F16H 7/08 474/140 |
| 6,086,498 A * | 7/2000 | Hashimoto | ............... | F16H 7/18 474/140 |
| 6,095,938 A * | 8/2000 | Kumakura | ............... | F16H 7/18 83/692 |
| 6,106,423 A * | 8/2000 | White | ...................... | F16H 7/08 474/140 |
| 6,302,816 B1 * | 10/2001 | Wigsten | .................... | F16H 7/18 474/140 |
| 6,312,351 B1 * | 11/2001 | Simpson | ............... | F16H 7/0848 474/140 |
| 6,312,353 B1 * | 11/2001 | Oba | ........................ | F16H 7/18 474/140 |
| 6,322,471 B1 * | 11/2001 | Hashimoto | .............. | F16H 7/18 474/140 |
| 6,612,952 B1 * | 9/2003 | Simpson | ................... | F16H 7/08 474/140 |
| 6,692,390 B2 * | 2/2004 | Ono | ........................ | F16H 7/18 474/140 |
| 7,074,145 B2 * | 7/2006 | Konno | .................... | F16H 7/18 474/140 |
| 7,118,503 B2 * | 10/2006 | Shum | ....................... | F16H 7/18 474/140 |
| 7,204,773 B2 * | 4/2007 | Ullein | ...................... | F16H 7/08 474/140 |
| 7,479,077 B2 * | 1/2009 | Markley | ................... | F16H 7/08 474/122 |
| 8,262,521 B2 * | 9/2012 | Bauer | ..................... | F16H 7/08 474/140 |
| 8,747,263 B2 * | 6/2014 | Konno | .................... | F16H 7/18 474/140 |
| 8,876,642 B2 * | 11/2014 | Adams | .................... | F16H 7/18 474/140 |
| 8,992,358 B2 * | 3/2015 | Adams | .................... | F16H 7/08 474/140 |
| 9,394,987 B2 * | 7/2016 | Pfeiffer | ................ | F16H 55/30 |
| 9,605,733 B2 * | 3/2017 | Geibel | ...................... | F16H 7/18 |
| 9,759,292 B2 * | 9/2017 | Moura | ..................... | F16H 7/18 |
| 9,777,809 B2 * | 10/2017 | Hirayama | ................. | F16H 7/18 |
| 2002/0045503 A1 * | 4/2002 | Young | ...................... | F16H 7/18 474/140 |
| 2002/0077204 A1 * | 6/2002 | Kumakura | ............... | F16H 7/18 474/140 |
| 2002/0132688 A1 * | 9/2002 | Ono | ......................... | F16H 7/18 474/140 |
| 2003/0040385 A1 * | 2/2003 | Konno | ..................... | F16H 7/18 474/140 |
| 2003/0064843 A1 * | 4/2003 | Konno | ..................... | F16H 7/18 474/140 |
| 2003/0134704 A1 * | 7/2003 | Konno | .................... | F01L 1/024 474/140 |
| 2004/0132569 A1 * | 7/2004 | Fujikubo | ............. | F16H 7/0848 474/140 |
| 2004/0214672 A1 * | 10/2004 | Thomas | ................... | F16H 7/18 474/140 |
| 2005/0049095 A1 * | 3/2005 | Shum | ....................... | F16H 7/18 474/140 |
| 2005/0239590 A1 * | 10/2005 | Foster | ..................... | F16H 7/18 474/140 |
| 2006/0223661 A1 * | 10/2006 | Haesloop | .............. | F16H 7/0831 474/140 |
| 2006/0240923 A1 * | 10/2006 | Yokoyama | ............. | F01L 1/024 474/140 |
| 2007/0004544 A1 * | 1/2007 | Mishima | ................... | F16H 7/08 474/140 |
| 2008/0113837 A1 * | 5/2008 | Ketterl | .................... | F16H 7/18 474/166 |
| 2011/0203867 A1 * | 8/2011 | Kakimoto | ................ | B62M 9/16 474/140 |
| 2011/0244999 A1 * | 10/2011 | Nakamura | ........... | F16H 57/023 474/140 |
| 2011/0251002 A1 * | 10/2011 | Mori | ........................ | F16H 7/06 474/140 |
| 2013/0035184 A1 * | 2/2013 | Konno | ..................... | F16H 7/18 474/111 |
| 2013/0090201 A1 * | 4/2013 | Mori | ........................ | F16H 7/18 474/140 |
| 2013/0225342 A1 * | 8/2013 | Yokoyama | ............. | F16G 13/06 474/140 |
| 2014/0179472 A1 * | 6/2014 | Kato | ........................ | F16H 7/08 474/140 |

* cited by examiner

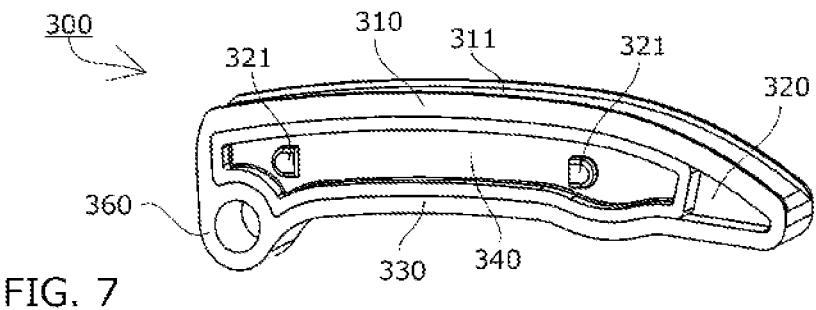
FIG. 7
FIG. 8
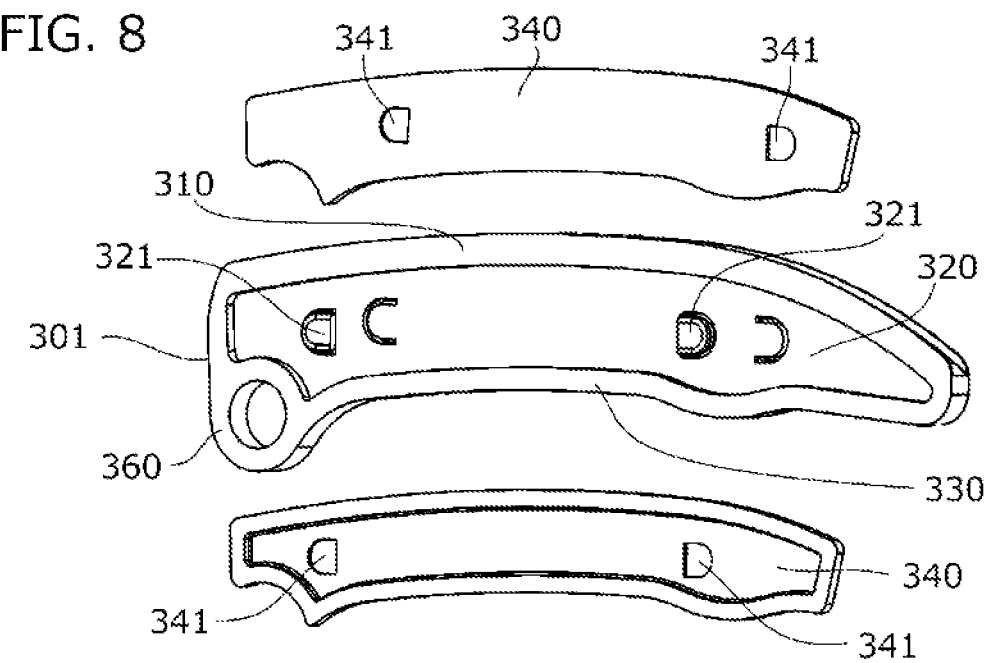

CHAIN GUIDE

BACKGROUND OF THE INVENTION

1. Field of the Invention

The present invention relates to a chain guide including a guide body having a guide shoe that slidably guides a running chain, and a supplementary member made of a different material from the guide body, the guide body including a guide part on the side facing the guide shoe, a base part located away from the guide part, and a support wall part between the guide part and the base part.

2. Description of the Related Art

It is the existing common practice to use a chain guide having a guide shoe that slidably guides a chain running between sprockets to stabilize the running chain and to keep a correct tension. A chain guide designed for reducing vibration and noise, made up of a guide body having a guide shoe, and a supplementary member made of a different material from the guide body, the guide body including a guide part on the side facing the guide shoe, a base part located away from the guide part, and a support wall part between the guide part and the base part, has been known (see, for example, U.S. Pat. No. 9,394,978).

The supplementary member (the vibration absorber 12) of this known chain guide is made of a thermoplastic elastomer or the like, and fixed to or united with the guide body (base body II) by injection molding or the like, to reduce vibration of the chain guide.

SUMMARY OF THE INVENTION

One problem with the chain guide of U.S. Pat. No. 9,394,978 was that the integrally formed guide body and supplementary member were made of different materials and the amount of thermal deformation differed between them. When subjected to high temperature during the operation of the engine or the like, or used in an environment with extreme temperature changes, the joints could come apart resulting from repeated deformation, and the supplementary member could detach from the guide body.

Detachment of the supplementary member can be prevented to some extent by providing through holes in the support wall part of the guide body with which the supplementary member is integrally formed as shown in FIG. 6 of U.S. Pat. No. 9,394,978. Even so, after repeated deformation, cracks could form due to the stress repeatedly concentrated in parts of the supplementary member inside the through holes, because of which the supplementary member could tear and fall off, or part of the material of the supplementary member could break off and contaminate the engine oil.

Gaps could also be formed between the guide body and the supplementary member due to a difference in the amount of thermal deformation between the guide body and the supplementary member, and depending on the conditions, such gaps could cause an increase in vibration and noise contrary to the purpose of the supplementary member.

The present invention solves these problems, its object being to provide a simple-structured chain guide with improved durability and capable of preventing detachment or breakage of a supplementary member and of reliably reducing vibration and noise.

The present invention solves the problems described above by providing a chain guide including a guide body having a guide shoe that slidably guides a running chain, and a supplementary member made of a different material from the guide body, the guide body including a guide part on a side facing the guide shoe, a base part located away from the guide part, and a support wall part provided between the guide part and the base part, the supplementary member being configured to include an engaging hole that allows attachment of the supplementary member to at least one side face of the support wall part.

According to the chain guide set forth in claim 1, the supplementary member is configured to include an engaging hole that allows attachment of the supplementary member to at least one side face of the support wall part. Detachment or breakage of the supplementary member can thereby be prevented because of the breakage-resistant engaging hole in the part subjected to repeated stress concentration caused by recurring deformation of the supplementary member.

The size and shape of the supplementary member may be designed freely in accordance with a conceivable difference in the amount of thermal deformation between the guide body and the supplementary member depending on the environment in which they are used, to ensure that vibration and noise that may occur because of gaps created between the guide body and the supplementary member are reduced.

According to the configuration set forth in claim 2, the supplementary member may be made of rubber that is highly capable of absorbing vibration, whereby vibration and noise can be reduced even more.

According to the configuration set forth in claim 3, the support wall part has a projection insertable to the engaging hole of the supplementary member, which enables a simple configuration easy to assemble.

According to the configuration set forth in claim 4, the engaging hole of the supplementary member is formed in a shape that allows the supplementary member to move along a longitudinal direction of the guide body relative to the projection. This reduces stress concentration to the engaging hole caused by repeated deformation of the supplementary member, whereby the possibility of detachment or breakage of the supplementary member can be reduced.

According to the configuration set forth in claim 5, the projection is disposed at each of two points in a longitudinal direction of the guide body and the projection disposed at at one of the two positions has a locking piece extending toward an opposite side from the projection at the other of the two positions. When the supplementary member is made of a material such as rubber that shrinks in a high-temperature or oil-present environment, the locking pieces make assembling even easier because they prevent detachment and obviate the need to force the projections into the holes.

According to the configuration set forth in claim 6, the chain guide further includes an engaging pin having a projection insertable to the engaging hole of the supplementary member. The support wall part has a pin insertion hole in which the engaging pin can be inserted. This allows for a simple structure of the guide body, and allows the projections, where stress is concentrated repeatedly, to be made from a different material, so that the possibility of breakage, not only of the supplementary member, but also of the guide body, can be minimized.

According to the configuration set forth in claim 7, the pin insertion hole of the support wall part is formed in a shape that allows the engaging pin to move along a longitudinal direction of the guide body relative to the support wall part, so that concentration of stress repeatedly applied between the guide body and the engaging pin can be reduced.

According to the configuration set forth in claim 8, the engaging hole of the supplementary member is formed in a shape that allows the engaging pin to move along a longitudinal direction of the guide body relative to the supplementary member, so that concentration of stress repeatedly applied between the supplementary member and the engaging pin can be reduced.

According to the configuration set forth in claim 9, the guide body has a concave section at least on one side face of the support wall part, the support wall part being a bottom face and the guide part and the base part being a side face of the concave section, i.e., the guide body is shaped to allow the supplementary member to be disposed inside the concave section, which enables reduction of vibration and noise without increasing the space taken up by the chain guide in the environment in which it is used.

BRIEF DESCRIPTION OF THE DRAWINGS

FIG. 7 is a perspective view of a chain guide (pivoting guide) according to a third embodiment of the present invention;

FIG. 8 is an exploded illustrative view of the chain guide of FIG. 7;

DESCRIPTION OF THE PREFERRED EMBODIMENTS

Figure 1:
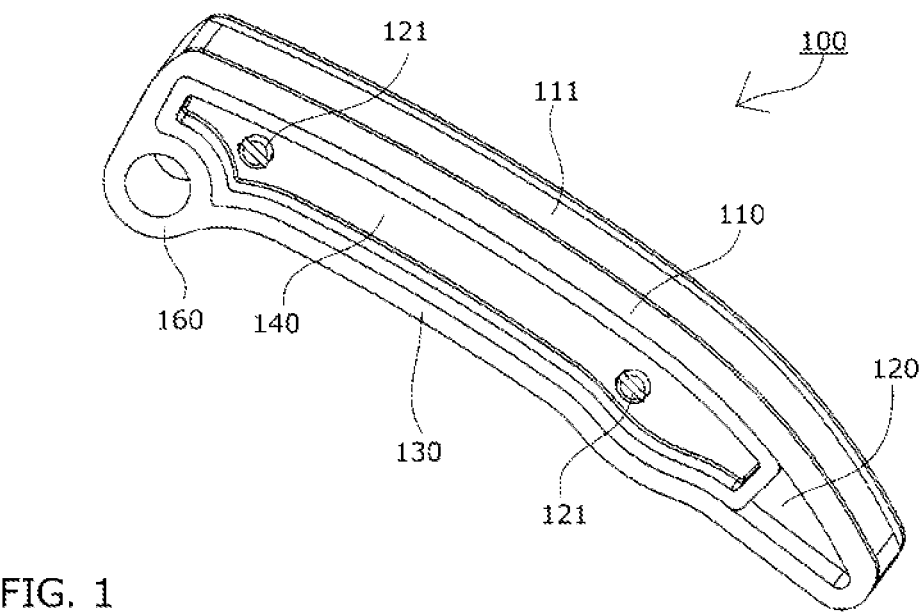
FIG. 1 is a perspective view of a chain guide (pivoting guide) according to a first embodiment of the present invention.
Figure 2:
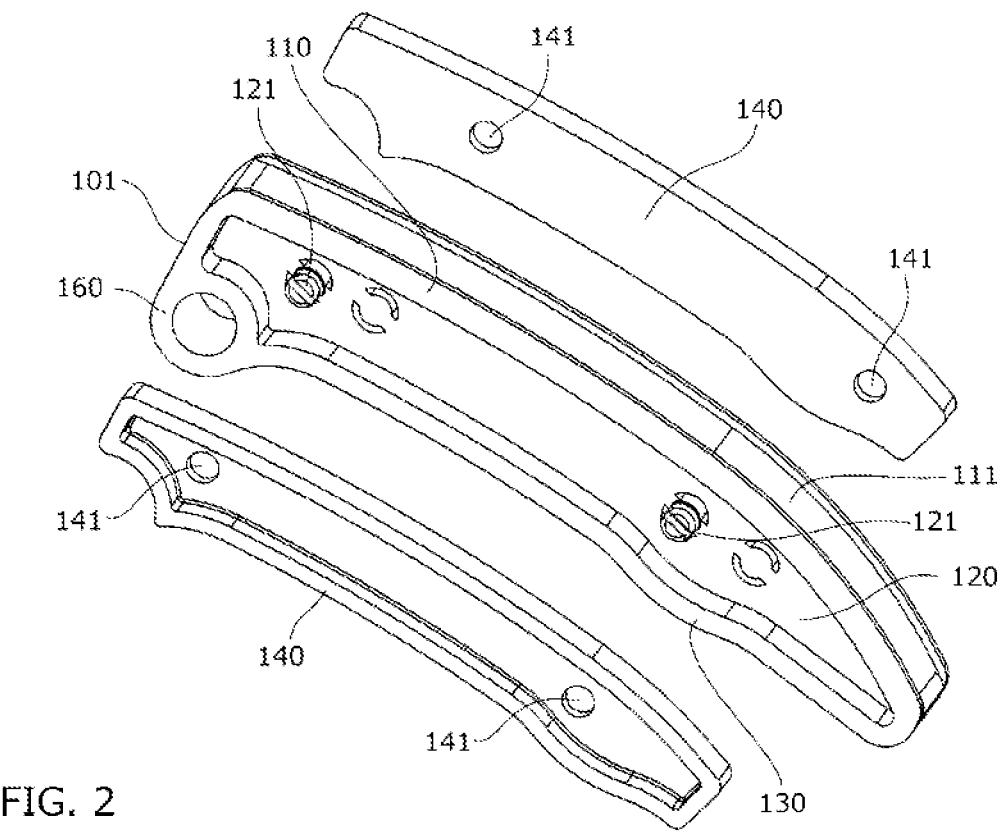
FIG. 2 is an exploded illustrative view of the chain guide of FIG. 1.
Figure 3:
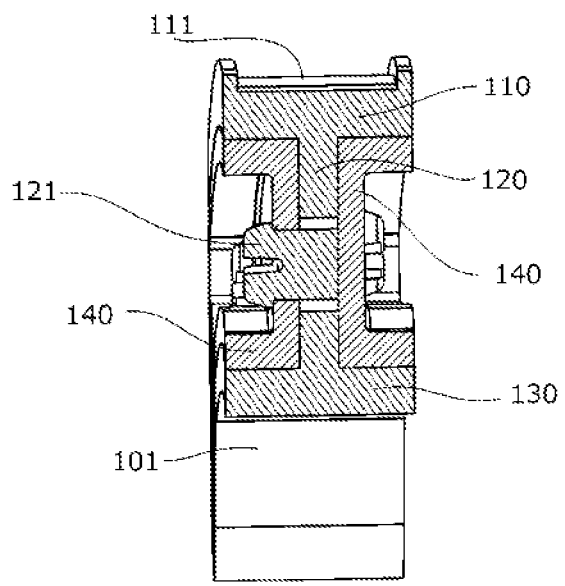
FIG. 3 is a cross-sectional view of the chain guide of FIG. 1.

A chain guide (pivoting guide) 100 according to a first embodiment of the present invention will be hereinafter described with reference to the drawings.

The chain guide 100 includes a guide body 101 having a sliding guide surface 111, which is a guide shoe that slidably guides a running chain, and a supplementary member 140 made of a different material from the guide body 101, as shown in FIG. 1 to FIG. 4.

The guide body 101 includes a guide part 110 on the side facing the sliding guide surface 111, a base part 130 located away from the guide part 110, a support wall part 120 provided between the guide part 110 and the base part 130, and a boss part 160 for attaching the chain guide pivotably in an engine room or the like.

Concave sections for accommodating supplementary members 140 are formed on both sides of the support wall part 120 of the guide body 101, with the support wall part 120 being bottom faces, and the guide part 110 and base part 130 being side faces.

The supplementary member 140 has two engaging holes 141 in a front part and a rear part of the longitudinal direction, while the support wall part 120 has projections 121 that can fit into the engaging holes 141 of the supplementary member 140, i.e., the supplementary member 140 is configured to be attachable to a side face of the support wall part 120.

Figure 4:
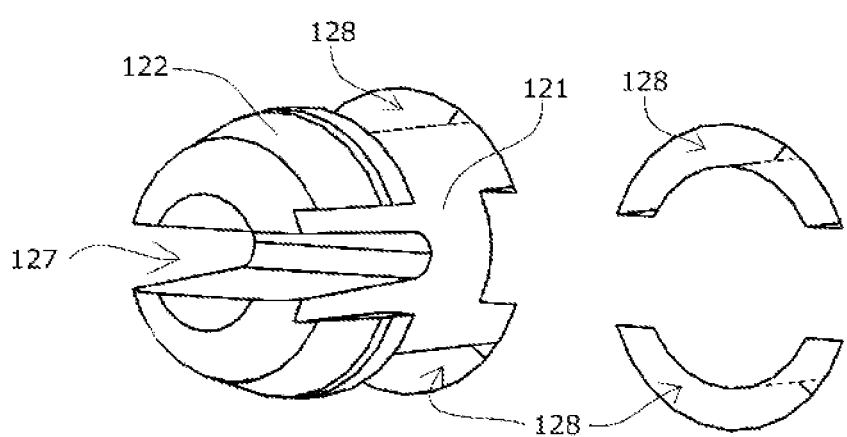
FIG. 4 is an enlarged view of the vicinity of a projection on a support wall part of the chain guide of FIG. 1.

The projection 121 has an insertion head 122 having a larger diameter than the engaging hole 141 of the supplementary member 140 and provided with an elastic slit 127, as shown in FIG. 4.

Since the supplementary member 140 is never removed both during use and when not in use once it is attached to the support wall part 120 in an assembly process, the insertion head 122 should preferably have a shape that allows easy insertion but prevents detachment, as shown in the drawing.

In this embodiment, there are through holes 128, which allow ejection from the molds of the injection molding or the like, in the support wall part 120 at the foot of the projections 121.

Due to the meld design of the injection molding or the like, the projections 121 are located at different positions on one side and the other side of the support wall part 120.

While the guide part 110 has the sliding guide surface 111 on the upper face thereof in this embodiment, a guide shoe formed by a different component may be fixed to the top of the guide body 101.

The supplementary member 140 should preferably be made of rubber for reducing vibration and noise.

The amount of deformation rubber undergoes with temperature changes is different from that of the guide body 101 made of resin or the like, and the rubber shrinks as time passes by the long-term use under a high-temperature or an oil-present environment. Even so, since the supplementary member is engaged with the projections 121 in the engaging holes 141, the surrounding parts of the engaging holes 141 entirely expand and contract so that stress is dispersed, which minimizes breakage caused by stress concentration and repeated deformation.

It is also possible to design the supplementary member 140 to be larger than the concave section in the guide body 101 to prevent any gaps from being formed when the supplementary member shrinks, or conversely, smaller than the concave section to ensure there is and will always be a clearance that does not generate vibration or noise even under temperature changes or aging degradation.

Figure 5:
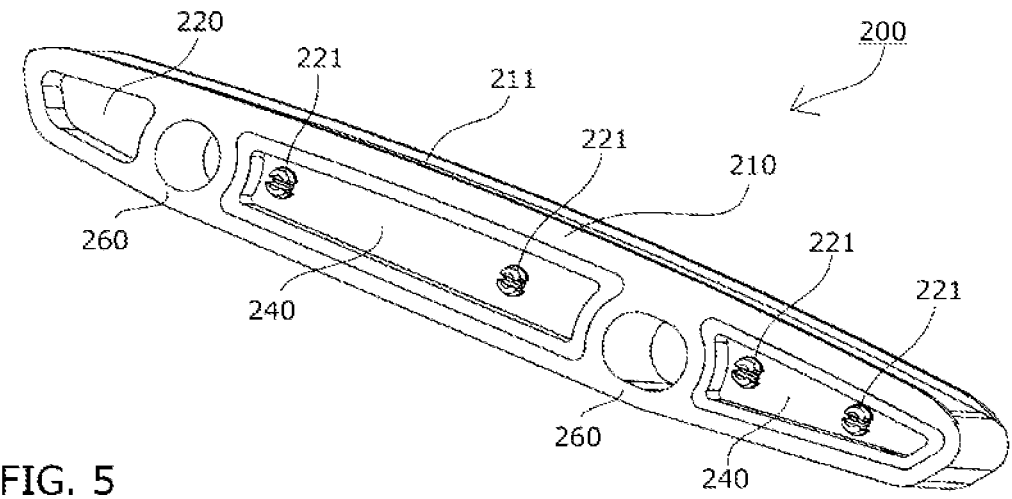
FIG. 5 is a perspective view of a chain guide (fixed guide) according to a second embodiment of the present invention.
Figure 6:
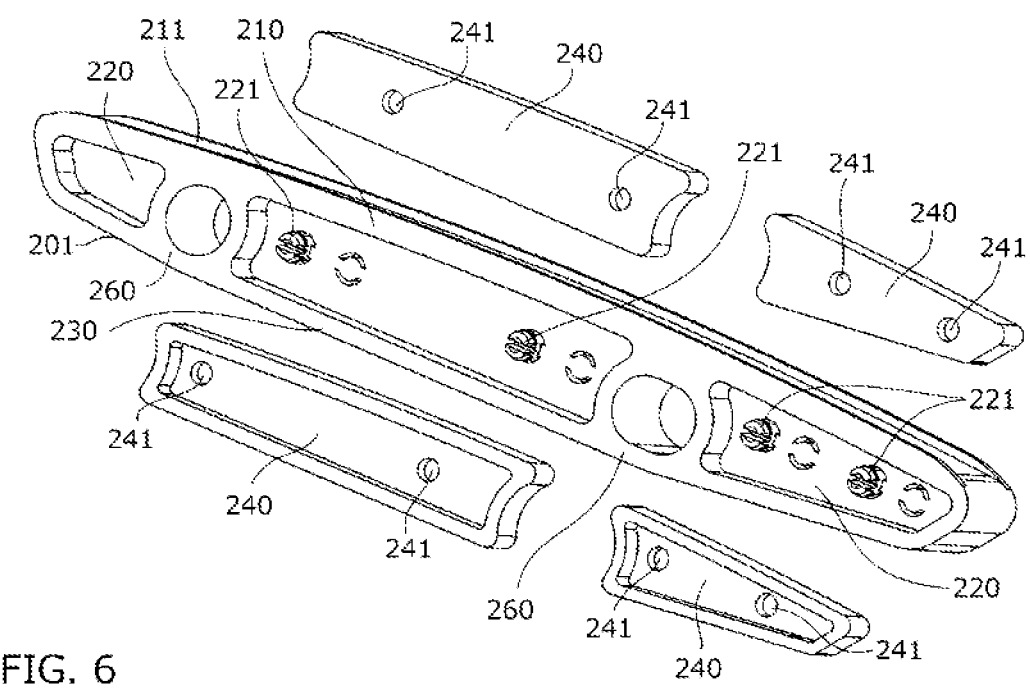
FIG. 6 is an exploded illustrative view of the chain guide of FIG. 5.

A chain guide 200 (fixed guide) according to a second embodiment of the present invention has boss parts 260 for fixing the chain guide in an engine room or the like at two points in the longitudinal direction, as shown in FIG. 5 and FIG. 6. Concave sections for accommodating supplementary members 240 are formed between the two boss parts 260 and between the boss parts and both outer ends in the longitudinal direction on both sides, with the support wall part 220 being bottom faces, and the guide part 210 and base part 230 being side faces, i.e., the guide body has six concave sections on both sides in total.

In this embodiment, supplementary members 240 are attached to four of these concave sections.

Other configurations are similar to those of the first embodiment.

Figure 9:
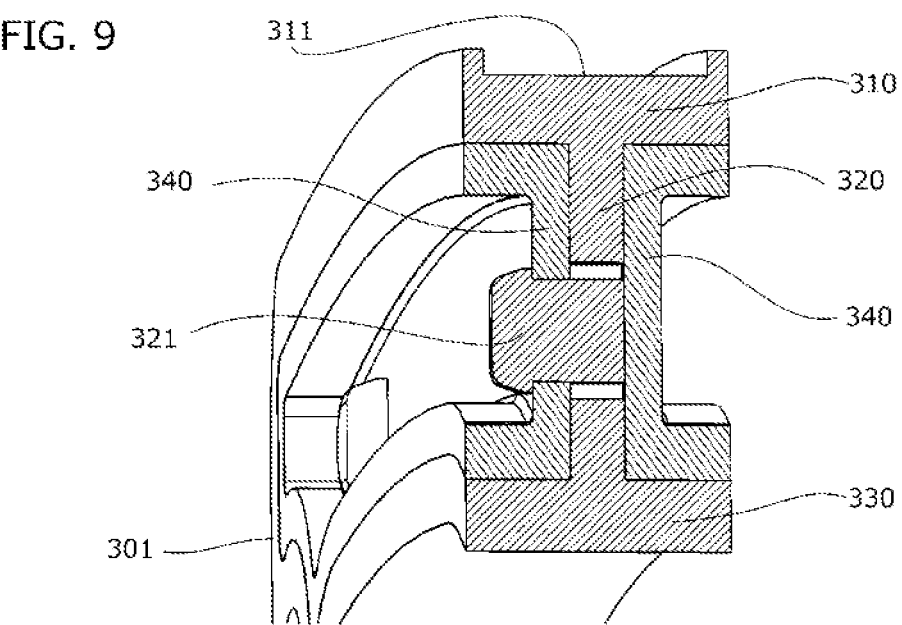
FIG. 9 is a cross-sectional view of the chain guide of FIG. 7.
Figure 10:
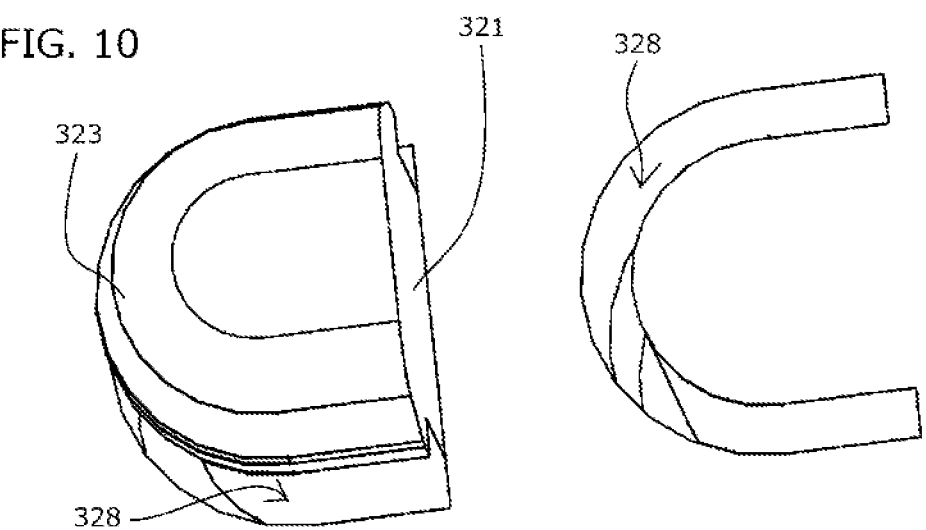
FIG. 10 is an enlarged view of the vicinity of a projection on a support wall part of the chain guide of FIG. 7.
Figure 11:
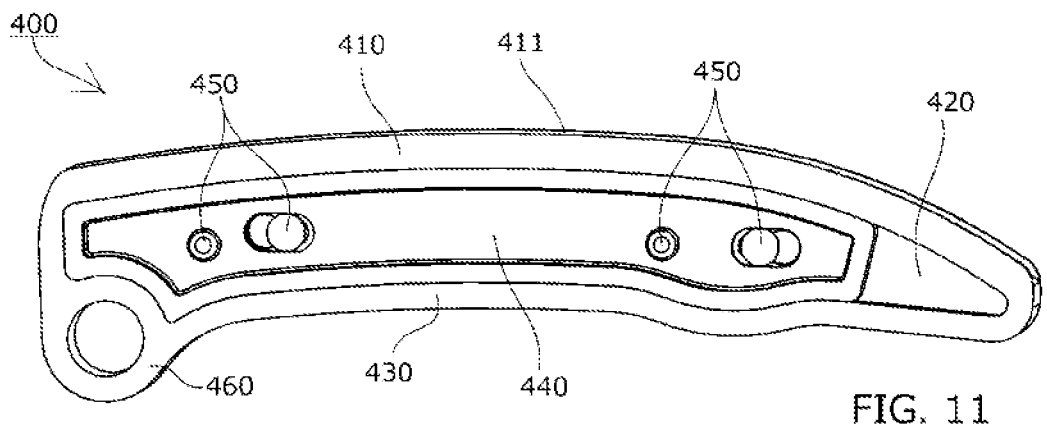
FIG. 11 is a perspective view of a chain guide (pivoting guide) according to a fourth embodiment of the present invention.
Figure 12:
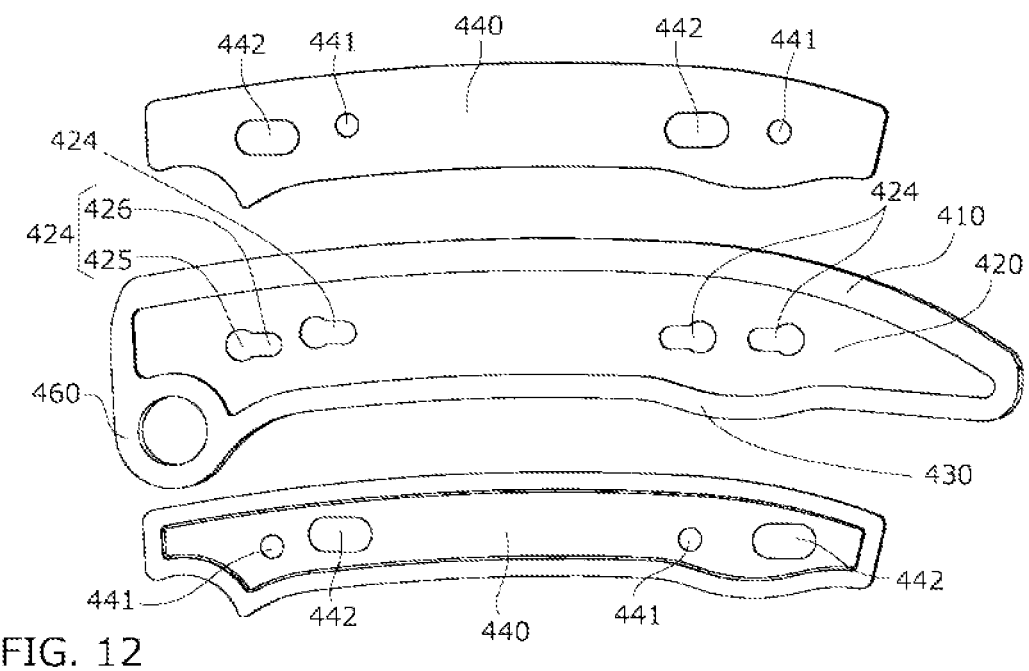
FIG. 12 is an exploded illustrative view of the chain guide of FIG. 11.

A chain guide 300 (pivoting guide) according to a third embodiment of the present invention has projections 321 that can fit into engaging holes 341 of the supplementary member 340 at two points in the longitudinal direction of the support wall part 320 as shown in FIG. 8 to FIG. 10. Each projection 321 includes a locking piece 323 at the tip extending to the opposite direction from the other projection 321.

As the locking piece 323 prevents detachment, the projections 321 need not be forced into the engaging holes, so that assembling is made even easier.

Other configurations are similar to those of the first embodiment.

A chain guide 400 (pivoting guide) according to a fourth embodiment of the present invention further includes engaging pins 450, which have an insertion head 452 that can fit into engaging holes 441 of the supplementary member 440, while the support wall part 420 has pin insertion holes 424 in which the engaging pins 450 are inserted, as shown in FIG. 11 to FIG. 14.

Figure 13:
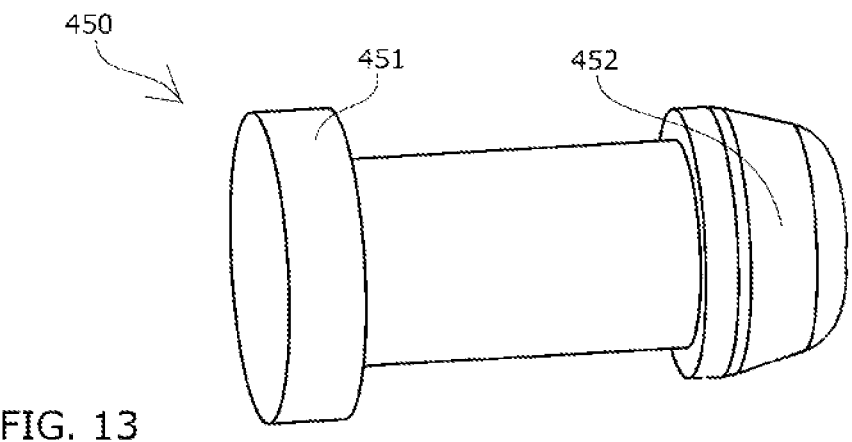
FIG. 13 is an enlarged view of an engaging pin of the chain guide of FIG. 11.
Figure 14:
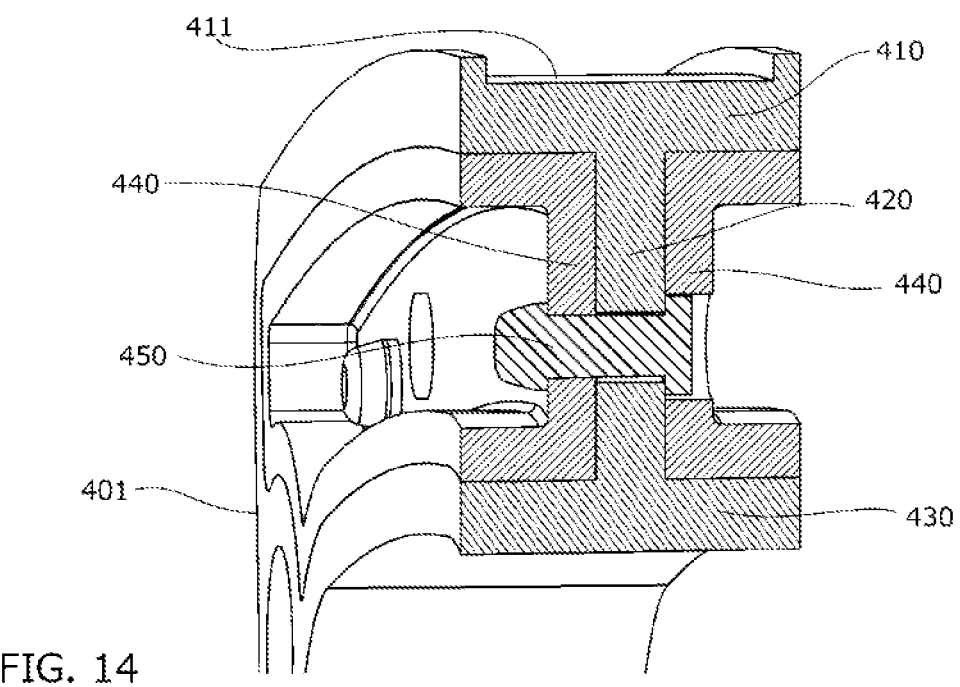
FIG. 14 is a cross-sectional view of the chain guide of FIG. 11.

The engaging pin 450 has a retention flange 451 on the opposite side from the insertion head 452, as shown in FIG. 13.

The pin insertion hole 424 of the support wall part 420 includes an attachment part 425 where the engaging pin 450 can pass through, and continuously therewith, a sliding part 426 where the retention flange 451 of the engaging pin 450 cannot pass through and the engaging pin 450 can slide along the longitudinal direction.

The supplementary member 440 is provided with clearance holes 442 for avoiding interference with the retention flanges 451 of the engaging pins 450 inserted into the supplementary member 440 on the opposite side.

Other configurations are similar to those of the first embodiment.

In this embodiment, the engaging pins 450 can slide inside the pin insertion holes 424 in accordance with deformation of the supplementary member 440, and therefore no stress is generated even when the supplementary member 440 undergoes shrinkage due to temperature changes or aging degradation.

While specific examples of the chain guide according to the present invention have been described in various embodiments above, the chain guide according to the present invention is not limited to these examples, and the shapes, positions, sizes, and positional relationships with each other of various constituent parts may be modified in various manners.

For example, while the guide part, base part, and support wall part together have an H-shaped cross section to accommodate the supplementary members in the concave sections formed on both side faces of the support wall part, in the embodiments described above, the supplementary member may be provided only on one side face.

Alternatively, the guide part, base part, and support wall part together may have a U-shaped cross section, and the supplementary member may be provided to the concave side face, or to the opposite side face, of the support wall part, or, the guide part, base part, and support wall part may have the same width, and the supplementary member may be provided to a side face of the guide body without a concave section.

While the chain guides of various embodiments described above are provided inside an engine having a timing system, the purpose of use is not limited to this and the chain guide can be applied to various instruments.

The chain guide may not necessarily be applied to a transmission mechanism that uses a chain but can also be used for similar transmission mechanisms that use belts, ropes and the like, and can be applied in a variety of industrial fields.

What is claimed is:

1. A chain guide comprising a guide body having a guide shoe that slidably guides a running chain, and a supplementary member made of a different material from the guide body,
    the guide body including a guide part on a side facing the guide shoe, a base part located away from the guide part, and a support wall part provided between the guide part and the base part,
    the supplementary member being configured to include an engaging hole that allows attachment of the supplementary member to at least one side face of the support wall part, and
    the supplementary member being made of rubber.

2. The chain guide according to claim 1, wherein the support wall part has at least one projection insertable to the engaging hole of the supplementary member.

3. The chain guide according to claim 2, wherein the engaging hole of the supplementary member is formed in a shape that allows the supplementary member to move relative to the projections along a longitudinal direction of the guide body.

4. The chain guide according to claim 2, wherein the projections are disposed at each of two points in a longitudinal direction of the guide body, and
    at least one of the projections has a locking piece extending to the opposite direction from the other projection.

5. The chain guide according to claim 1, further comprising an engaging pin having an insertion head insertable to the engaging hole of the supplementary member,
    the support wall part having a pin insertion hole in which the engaging pin can be inserted.

6. The chain guide according to claim 5, wherein the pin insertion hole of the support wall part is formed in a shape that allows the engaging pin to move along a longitudinal direction of the guide body relative to the support wall part.

7. The chain guide according to claim 5, wherein the engaging hole of the supplementary member is formed in a shape that allows the engaging pin to move along a longitudinal direction of the guide body relative to the supplementary member.

8. A chain guide comprising a guide body having a guide shoe that slidably guides a running chain, and a supplementary member made of a different material from the guide body, wherein
    the guide body includes a guide part on a side facing the guide shoe, a base part located away from the guide part, and a support wall part provided between the guide part and the base part,
    the supplementary member is configured to include an engaging hole that allows attachment of the supplementary member to at least one side face of the support wall part, and
    the guide body has a concave section at least on one side face of the support wall part, the support wall part being a bottom face and the guide part and the base part being a side face of the concave section.

* * * * *